Dec. 18, 1962  E. J. GOLEC  3,069,109
SPIN-CAST FISHING REEL
Filed Nov. 13, 1959
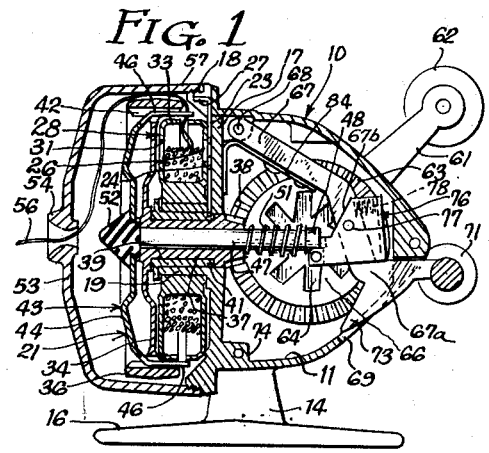
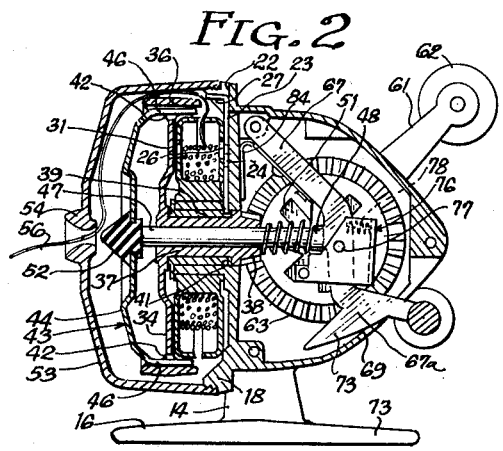
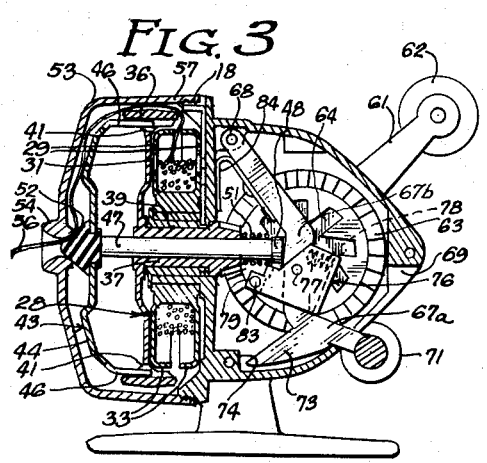
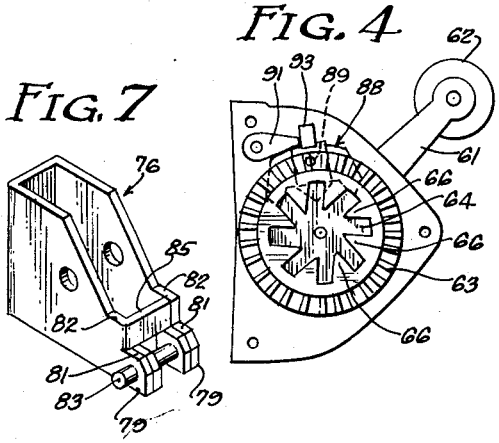
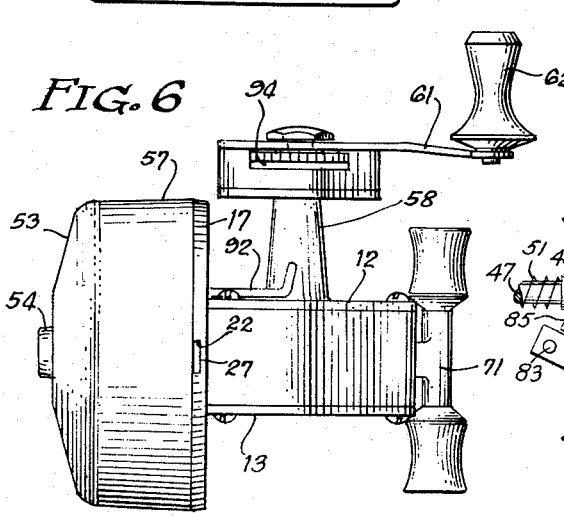
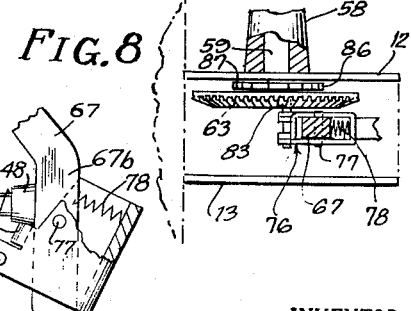
INVENTOR.
Edward J. Golec
BY Nathan H. Kraus
Frank H. Marlos
Attorneys

United States Patent Office 3,069,109
Patented Dec. 18, 1962

3,069,109
SPIN-CAST FISHING REEL
Edward J. Golec, Chicago, Ill., assignor to Sears, Roebuck and Co., Chicago, Ill., a corporation of New York
Filed Nov. 13, 1959, Ser. No. 852,857
4 Claims. (Cl. 242—84.2)

My invention relates to fishing reels and more particularly to casting reels of the spinning type.

One of the objects of my invention is the provision of a fishing reel of the foregoing character in which the spool and winding mechanism are enclosed and are thus protected against dirt, grit and other foreign matter.

Another object of my invention is the provision in a fishing reel of several control features by which variable tension may be applied to the line as desired, when in use, and the mechanism may be locked to prevent the line from being run out when the line is not in use.

A further object of my invention is the provision of a novel sear mechanism operable to securely hold the flyer in retracted position for casting to permit free unwinding of the line, yet being readily releasable by the forward rotation of the winding crank handle to effect actuation of the flyer to line-winding position.

Still a further object of this invention is the provision of releasable means affording effective securement of the flyer in assembled relation on the reel yet permitting rapid release of the flyer for purposes of disassembly and removal of the line spool.

Still a further object of this invention is the provision of a fishing reel of the foregoing type which is simple in construction, efficient in operation, and economical to manufacture.

Other and further objects and advantages of my invention will become apparent from the following description when considered in connection with the accompanying drawings, in which:

FIG. 1 is a longitudinal cross-sectional view of a fishing reel embodying my invention and showing the parts in line-retrieving position;

FIG. 2 is a similar view but showing the parts in casting position;

FIG. 3 is a view similar to FIG. 2 but showing the parts moved to a position to control run-out-of-the line under controlled resistance;

FIG. 4 is a side elevational view of a sub-assembly;

FIG. 5 is a top plan view of the sub-assembly illustrated in FIG. 4 with certain parts broken away;

FIG. 6 is a top plan view of the fishing reel embodying my invention;

FIG. 7 is a perspective view on an enlarged scale of a sear element; and

FIG. 8 is a fragmentary side elevational view, on an enlarged scale, showing the relationship of certain parts as illustrated in FIG. 2.

Referring to the drawings, my improved reel comprises a housing 10 shaped substantially as illustrated and formed with an internal cavity 11 which opens though both sides thereof. The open sides of the housing are normally closed by cover plates 12 and 13 secured as by screws to the housing. A seat post 14 integral with the housing 10 depends therefrom and terminates in the usual elongated tang 16 by which the reel may be attached to a conventional fishing rod. The housing 10 includes an integral circular forward wall 17 having a forwardly extending annular flange 18 provided with external screw threads. The wall 17 supports a bearing bushing 19 centrally thereof in which is journaled the line-winding flyer assembly, indicated generally by the numeral 21 and hereinafter to be more fully described. A radial groove 22 is provided in the forward face of the wall 17 and extends from the inner bore of the bushing 19 through the flange 18. A latch member 23 is received in the groove 22 for sliding radial movement. The latch member 23 is provided with an elongated aperture 24 which cooperates with a headed pin 26 secured in the bottom of the groove 22, the pin and aperture cooperating to limit radial movement of the latch member 23. The upper end of the latch member 23 is bent substantially at right angles to afford a finger-engaging portion 27 for actuating the same.

A line spool 28 is mounted on the bushing 19 and each side flange 29 thereof is provided with an aperture 31 adapted to receive the head of pin 26 when a spool flange 29 is abutted against the face of the wall 17, it being understood of course that the head of the pin 26 is flush with the inner wall of the flange 29. The spool 28 thus is prevented from rotating on the bushing 19. Each flange 29 of the spool is provided with an in-turned annular flange 33 with the flanges 33 being spaced and in confronting relation, as illustrated. The flanges so disposed effectively prevent the line from inadvertently escaping from the spool.

The flyer assembly 21 includes a circular disk 34 having an annular peripheral flange 36 projecting beyond opposite sides of the disk and having fixed thereto axially thereof a tubular spindle 37 terminating in a bevel pinion 38 spaced from the plane of the disk 34. Rotatably supported on the spindle 37 is a bushing 39 having an annular groove 41 in close proximity to the end adjacent the pinion 38. The disk 34 is provided with a series of circumferentially spaced slots 42 adjacent the flange 36. As will be apparent from the drawing, the lower end of the latch member 23 is adapted to engage in groove 41 to lock the flyer assembly 21 in position while permitting rotation of the same.

A retractable line-winding element 43 comprising a cupped disk member 44 having a series of circumferentially spaced, rearwardly directed, integral fingers 46, each arranged to project through a respective slot 42 is disposed adjacent the disk 34 and within the flange 36. The disk member 44 is fixedly mounted on a rod 47 which is slidably received in the bore of the spindle 37. The end of the rod 47 has an enlarged slightly tapered head 48 affording an abutment shoulder for the compression spring 51 concentric with the rod 47. The spring normally biases the rod 47 and associated line-winding element 43 to the right or to line-winding position as viewed in FIG. 1 wherein the ends of the fingers 46 project beyond the rearward edge of the flange 36 and overlie the open space between the flanges 33 of the spool. A cone-shaped, resilient tip 52 is attached to the center of the forward face of the disk member 44 for a purpose, as will be hereinafter explained. A cup-shaped hood 53 is provided at its center with an open grommet 54 through which the line 56 is adapted to pass and the flange 57 of the hood is provided with internal screw threads for engagement with the threads of the flange 18. As should be apparent, the disk 34 and line-winding element 43, because of the interengaging arrangement of the fingers 46 in the slots 42, will be caused to rotate as a unit, although the element 43 may be moved axially relatively to the disk 34.

A bearing sleeve 58 is formed and extends outwardly from the cover plate 12 to form a bearing for a drive shaft 59 adapted to be rotated by means of a hand crank 61 provided with a suitable finger grip 62. A bevel gear 63 is mounted on the inner extremity of the shaft 59 within the cavity 11 and meshes with the bevel pinion 38. It will be apparent that rotation of the hand crank 61 will effect rotation of the flyer 21. The bevel gear 63 is provided on its inner face with connecting recessed areas substantially in the form of a star wheel 64, as illustrated in FIG. 4, affording a series of circumferentially spaced triangular camming elements 66.

A triple-armed actuating bar 67 shaped substantially as illustrated is disposed within the cavity 11 and is pivotally connected at its upper end to the housing 10 as at 68. The lowermost arm 67a of the bar passes through an elongated slot 69 in the rear wall of the housing 11 and terminates in a transversely extending finger grip 71. The lowermost arm 67a has an integral extension 73 which, when the parts of the reel assume the position illustrated in FIG. 1, affords a closure for the slot 69 and also affords a stop to limit downward movement of the actuating bar 67 the limit of such movment being when the extension 73 abuts against shoulder 74 in the housing.

A sear element 76 generally in the form of a channel-shaped member embraces the intermediate arm 67b of the actuating bar 67 and is pivotally connected thereto as at 77. A spring 78 interposed between actuating bar 67 and the sear element 76 biases the latter in a clockwise direction as viewed in FIG. 2. The lower portion of each of the opposed walls of the sear element 76 is formed with a forward extension 79 providing in each wall edge two stepped shoulders 81 and 82 with corresponding shoulders of opposed walls being in registration. The wall portions of the forward extensions 79 below the lower shoulders 81 are thickened so that the enlarged head 48 is caused to engage only the upper inner corners of the lower shoulders 81 when the parts are in the position illustrated in FIG. 1, corresponding to retrieving position for the reel, since the open space between the thickened extensions 79 has a width less than that of the head 48. A pin 83 is secured in registering perforations provided in both of the extensions 79 and projects into the recessed areas 64 of the bevel gear 63, the projecting portion of the pin 83 being engageable with the camming elements 66.

The upper shoulders 82 have a bridging portion 85 across the same which is abutted by the head 48 when the parts are in line retrieving position as illustrated in FIG. 2. Said bridging portion also is adapted to engage with the head 48 to lock the rod 47 against axial movement, for casting purposes, as will be hereinafter described.

A leaf spring 84 interposed between the wall 17 and the actuating bar 67 normally biases said bar counterclockwise, as viewed in FIG. 1 to line-retrieving position.

Mounted on shaft 59 and disposed intermediate the bevel gear 63 and the cover plate 12 is a ratchet-like member 86 having a plurality of spaced radially extending teeth 87. A double armed pawl member 88 shaped substantially as shown is pivotally mounted on the inner surface of the face plate 12 as at 89. As the member 86 is caused to be rotated by rotation of the hand crank 61, in either direction, the teeth of the member 86 effect a camming action on one of the arms of the pawl member 88, depending upon the direction of rotation, and causing the same to pivot in an opposite direction so that the other arm of the pawl member is caused to abut one of the teeth and thereby lock the member 86 and correspondingly the hand crank 61 against movement in either direction. A latch element 91 is pivotally mounted on the face plate 12 within the cavity and is operatively connected with an exterior lever 92 which cooperates with the extension 93 of the pawl member 88 to prevent rocking of the pawl member in a counterclockwise direction, as viewed in FIG. 4. Thus, the pawl member 88 is rendered inoperative so as to permit rotation of the hand crank 61 in line retrieving direction. The pawl member 88 however is still effective to prevent movement of the hand crank 51 in a reverse direction.

Adjustable friction means of conventional construction and generally indicated by the numeral 94 is associated with the hand crank 61 and drive shaft 59 for controlling the drag desired on the line after a catch has been made.

The above described reel operates in the following manner: Assuming that a rewinding operation has just been completed, at this stage the parts of the reel will be in the position illustrated in FIG. 1 in which it will be noted that the fingers 46 of the retractable line-winding element 43 project beyond the flange 36 and overlie the opening between the confronting flanges 33 of the spool and the head 48 engages the shoulders 81 and abuts the bridging member 85. To prepare the reel for casting, the operator presses his thumb down on the thumb grip 71, urging the actuating member 67 to rock in a clockwise direction, as viewed in FIG. 2. Such movement moves the rod 47 to the left and carries the sear element 76 downwardly to a point where the bridging member 85 is disposed below the head 48 and the head directly abuts the intermediate arm 67b of the actuating member as illustrated in FIG. 2. Correspondingly, since the sear element 76 is biased in a clockwise direction, the upper edge of the bridging portion 85 frictionally engages against and interlocks with the tapered head 48 effecting a locking of the line-winding element 43 in the position illustrated in FIG. 2. It will be understood that spring 78 which biases the sear element 76 exerts a force against counterclockwise turning of sear element 76, as viewed in FIG. 2, considerably greater than the combined forces exerted by springs 51 and 84 such that the actuating member 67 and rod 47 are retained in the position illustrated in FIG. 2. In this position the fingers 46 are withdrawn fully within the flange 36. The space between the confronting flanges 33 of the spool is now clear and the line is in a position to unwind from the spool without interference and to pass freely through the opening in grommet 54. The operator may now cast in the usual manner and if he desires to control the playout of the line so as to more accurately control the disposition of the lure, he may engage the thumb grip 71 to urge the actuating lever 67 farther to the left, as viewed in FIG. 3, thereby effecting a further movement to the left of the rod 47 and line-winding element 43 so that the resilient tip 52 engages the mouth of the opening in the grommet 54, thereby squeezing the line between the grommet and the tip 52 and effecting a retarding action on the playout of the line.

As will be apparent by reference to FIG. 1 during normal line-retrieving position, the extension of pin 83 is disposed substantially in the central portion of the recessed area 64 of the beveled gear 63. When the actuating lever 67 is rocked in a clockwise direction, the pin 83 is caused to be carried within one of the radial arm portions of the recessed area 64 substantially to the base of one of the triangular cam portions 66 (see FIG. 2).

In order to retrieve the line, the operator begins to rotate the hand crank 61 so that the bevel gear is caused to rotate in a counterclockwise direction, as viewed in FIG. 2. The pin 83 thus is caused to be engaged by the upper surface portion of one of the cam elements 66 which effects a slight rocking of the actuating lever 67 in a counterclockwise direction to a point where the upper shoulder of the bridging portion 85 is carried free of the head 48 and the spring 84 effects a return of the actuating lever 67 to normal line-retrieving position as illustrated in FIG. 1. As the actuating lever 67 assumes the position of FIG. 1, the spring 51 urges the line-winding element 43 to the right wherein the fingers 46 project beyond the edges of the flange 36 and one of the fingers is in a position to engage the line immediately adjacent the spool. Thereafter continued rotation of the hand crank will effect rotation of the flyer and rewinding of the line on the spool.

As will be seen by reference to FIGS. 1–3, the lower end of the latch member 23 is engaged in the annular groove 41 of bushing 39 and thereby retains the flyer 21 in assembled relation relative to the housing. The hood 53 retains the latch member in locking position preventing inadvertent displacement of the same. In order to disassemble the reel, the hood 53 is unscrewed to expose the finger portion 27 of the latch member 23. By moving the latch member 23 upwardly the lower end of the latch member is disengaged from the groove 41 freeing the flyer assembly 21 for separation from the housing.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. In a spinning type fishing reel,
   (a) a non-rotatable spool,
   (b) a flyer disposed adjacent said spool and including as a part thereof a line-retrieving member having at least one line-engaging finger adjacent to and arranged to overlie the spool periphery and mounted to revolve about the axis of the spool,
   (c) said finger being movable axially toward and away from the spool to line-engaging and non-line-engaging positions respectively,
   (d) a hand crank,
   (e) a driving gear rotatable by said crank,
   (f) a pinion operatively connected with said flyer and with said driving gear for rotating said flyer,
   (g) a rod fixedly connected to said line-retrieving member and extending axially through said spool and pinion,
   (h) said rod having an enlarged head portion tapering towards said flyer and being supported for axial sliding movement,
   (i) first spring means biasing said rod and line-retrieving member to line-engaging position,
   (j) a pivotally mounted actuating member engageable against said head portion,
   (k) second spring means biasing said actuating member to retracted position out of engagement with said rod,
   (l) a sear element pivotally mounted on said actuating member and engageable with said head portion, and
   (m) third spring means biasing said sear element in a direction to engage said head portion,
   (n) the force of said third spring means being greater than the combined forces of said first and second spring means so that said line-retrieving member is retained in non-line-engaging position during a casting operation.

2. In a spinning type fishing reel,
   (a) a non-rotatable spool,
   (b) a flyer disposed adjacent said spool and including as a part thereof a line-retrieving member having at least one line-engaging finger adjacent to and arranged to overlie the spool periphery and mounted to revolve about the axis of the spool,
   (c) said finger being movable axially toward and away from the spool to line-engaging and non-line-engaging positions respectively,
   (d) a hand crank,
   (e) a driving gear rotatable by said crank,
   (f) a pinion operatively connected with said flyer and with said driving gear for rotating said flyer,
   (g) a rod fixedly connected to said line-retrieving member and extending axially through said spool and pinion,
   (h) said rod having abutment means at one end and being supported for axial sliding movement,
   (i) first spring means biasing said rod and line-retrieving member to line-engaging position,
   (j) a pivotally mounted actuating member engageable with the end of said rod,
   (k) second spring means biasing said actuating member out of engagement with said rod,
   (l) a sear element pivotally mounted on said actuating member and engageable with said abutment means,
   (m) third spring means biasing said sear element in a direction to engage said abutment means,
   (n) the force of said third spring means being greater than the combined forces of said first and second spring means so that said line-retrieving member is retained in non-line-engaging position during a casting operation, and
   (o) means operable upon the forward turning of the hand crank to disengage said sear element from said abutment means whereby said first spring means will move said line-retrieving member and said finger to line-engaging position.

3. In a spinning type fishing reel,
   (a) a non-rotatable spool,
   (b) a flyer disposed adjacent said spool and including as a part thereof a line-retrieving member having at least one line-engaging finger adjacent to and arranged to overlie the spool periphery and mounted to revolve about the axis of the spool,
   (c) said finger being movable axially toward and away from the spool to line-engaging and non-line-engaging positions respectively,
   (d) a hand crank,
   (e) a driving gear rotatable by said crank,
   (f) a pinion operatively connected with said flyer and with said driving gear for rotating said flyer,
   (g) a rod fixedly connected to said line-retrieving member and extending axially through said spool and pinion,
   (h) said rod having abutment means at one end and being supported for axial sliding movement,
   (i) first spring means biasing said rod and line-retrieving member to line-engaging position,
   (j) a pivotally mounted actuating member engageable with the end of said rod,
   (k) second spring means biasing said actuating member out of engagement with said rod,
   (l) a sear element pivotally mounted on said actuating member and engageable with said abutment means,
   (m) third spring means biasing said sear element in a direction to engage said abutment means,
   (n) the force of said third spring means being greater than the combined forces of said first and second spring means so that the line-retrieving member is retained in non-line-engaging position during a casting operation,
   (o) cam means carried on said driving gear, and
   (p) cam follower means carried on said sear element,
   (q) the forward turning of said hand crank moving said cam means into engagement with said cam follower means to rock said sear element out of engagement with said abutment means whereby said first spring means will move said line-retrieving member and finger to line-engaging position.

4. In a spinning type fishing reel,
   (a) a non-rotatable spool,
   (b) a flyer disposed adjacent said spool and including as a part thereof a line-retrieving member having at least one line-engaging finger adjacent to and arranged to overlie the spool periphery and mounted to revolve about the axis of the spool,
   (c) said finger being movable axially toward and away from the spool to line-engaging and non-line-engaging positions respectively,
   (d) a hand crank,
   (e) a driving gear rotatable by said crank,
   (f) a pinion operatively connected with said flyer and with said driving gear for rotating said flyer,
   (g) a rod fixedly connected to said line-retrieving member and extending axially through said spool and pinion,
   (h) said rod having abutment means at one end and being supported for axial sliding movement,
   (i) first spring means biasing said rod and line-retrieving member to line-engaging position,
   (j) a pivotally mounted actuating member engageable with the end of said rod, (k) second spring means biasing said actuating member out of engagement with said rod,
(l) a sear element pivotally mounted on said actuating member and engageable with said abutment means,
(m) third spring means biasing said sear element in a direction to engage said abutment means,
(n) the force of said third spring means being greater than the combined forces of said first and second spring means so that the line-retrieving member is retained in non-line-engaging position during a casting operation,
(o) said driving gear having on one face thereof a recessed area in which a wall thereof affords a camming surface,
(p) said sear element having a projection extending into said recessed area,
(q) said camming surface upon the forward rotation of said hand crank being caused to be operatively engaged with said projection so as to effect rocking of said sear element and disengagement of the same with said abutment means whereby said first spring means will move said line-retrieving member and finger to line-engaging position.

References Cited in the file of this patent

UNITED STATES PATENTS

| | | |
|---|---|---|
| 2,613,468 | Hand | Oct. 14, 1952 |
| 2,644,647 | Denison et al. | July 7, 1953 |
| 2,719,680 | Denison et al. | Oct. 4, 1955 |
| 2,834,559 | Nagy | May 13, 1958 |
| 2,843,333 | Jones | July 15, 1958 |
| 2,903,202 | Sarah | Sept. 8, 1959 |